(No Model.) 4 Sheets—Sheet 1.
O. KONIGSLOW.
BASKET BAIL.
No. 513,512. Patented Jan. 30, 1894.
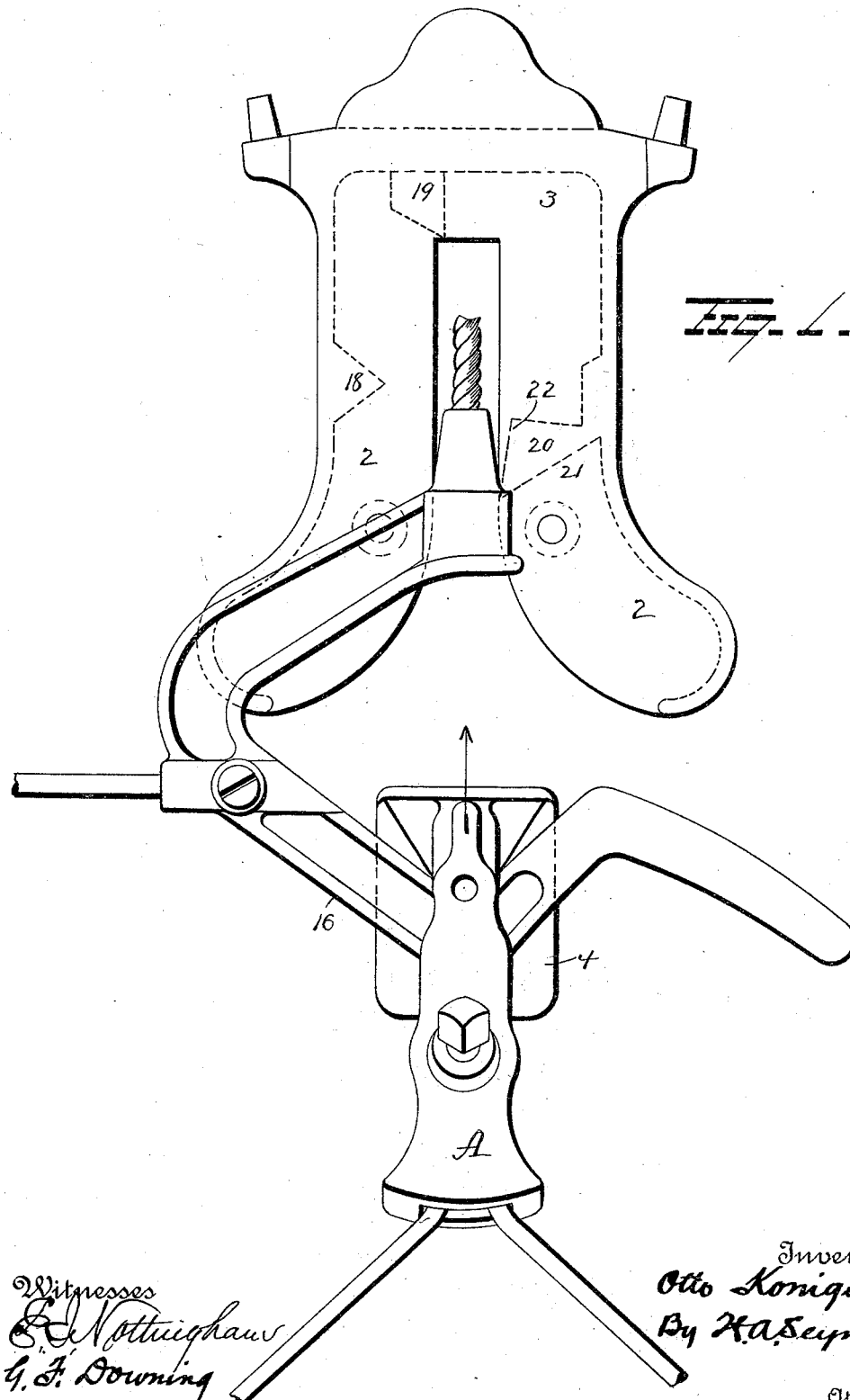
Witnesses
L. Nottingham
G. F. Downing
Inventor
Otto Konigslow
By H. A. Seymour
Attorney (No Model.) 4 Sheets—Sheet 2.
O. KONIGSLOW.
BASKET BAIL.
No. 513,512. Patented Jan. 30, 1894.
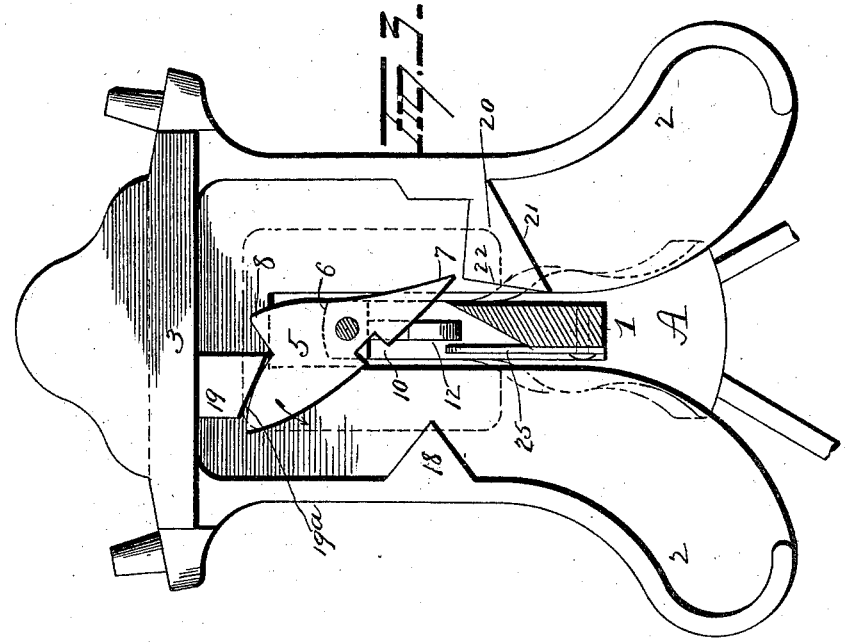
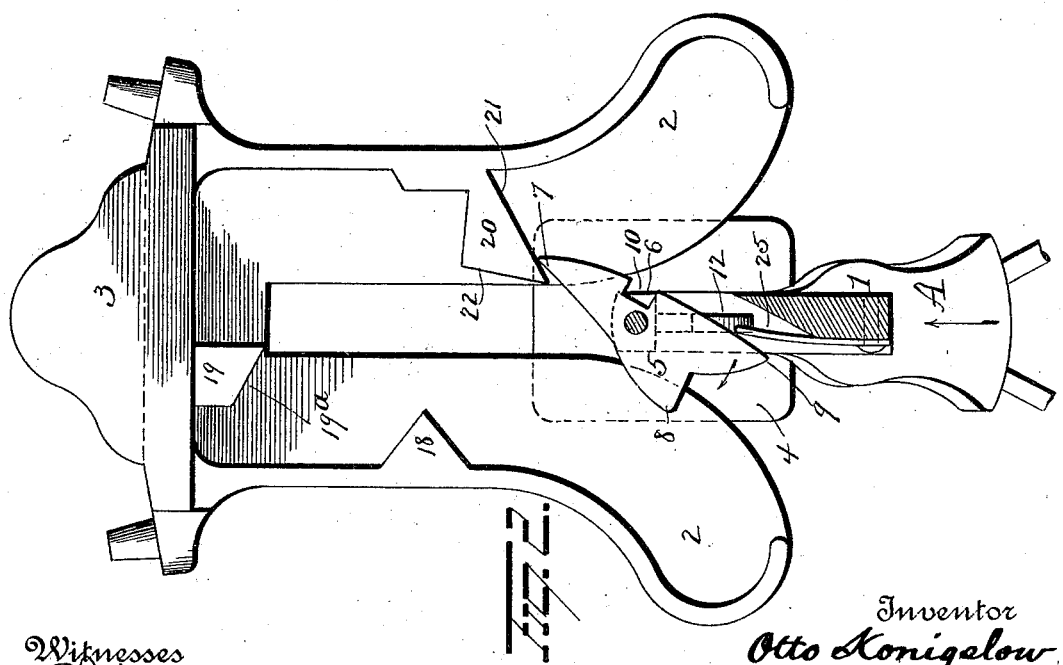
Witnesses
R. E. Nottingham
G. F. Downing.
Inventor
Otto Konigslow
By H. A. Seymour
Attorney.

(No Model.) 4 Sheets—Sheet 3.
O. KONIGSLOW.
BASKET BALL.
No. 513,512. Patented Jan. 30, 1894.
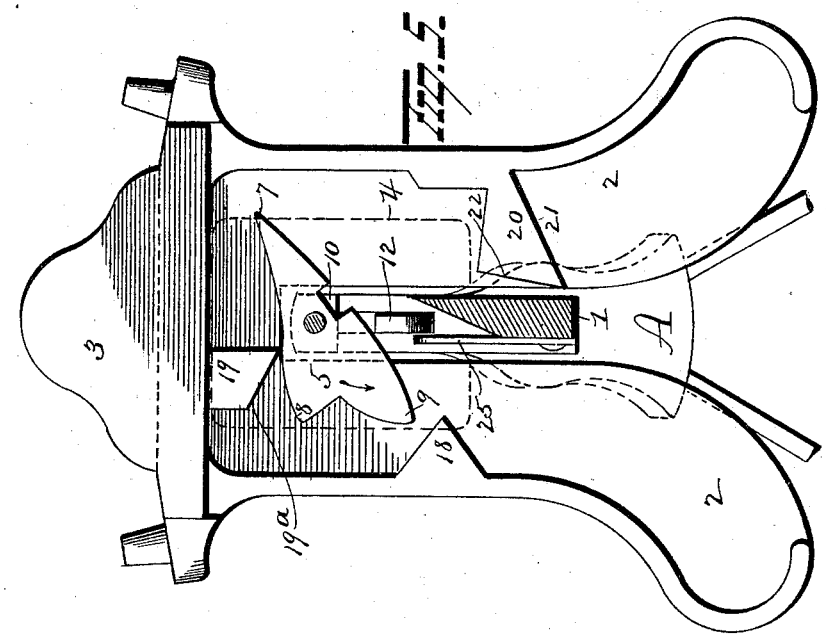
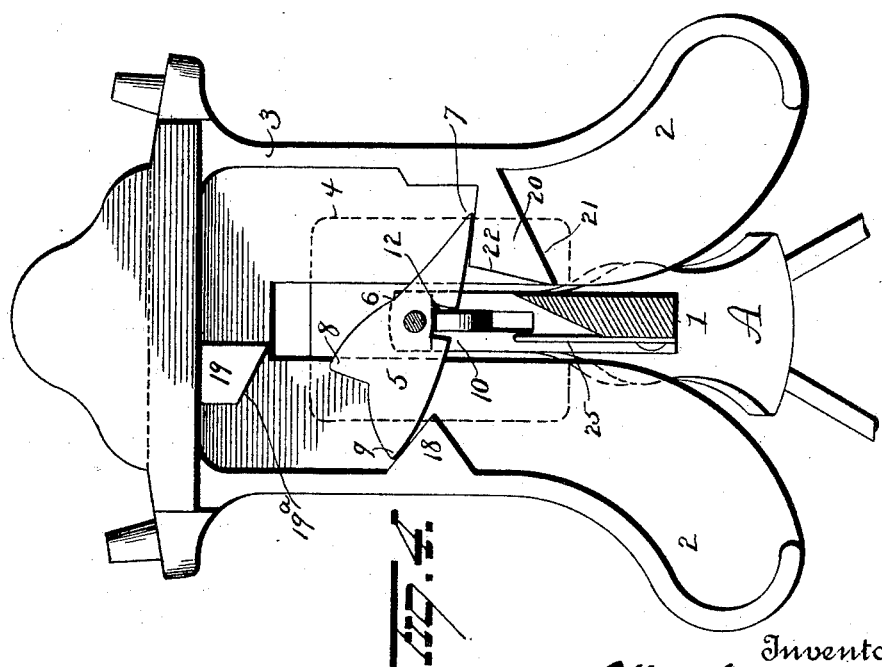
Witnesses
E. L. Nottingham
G. F. Downing.
Inventor
Otto Konigslow,
By H. A. Seymour
Attorney (No Model.) 4 Sheets—Sheet 4.
O. KONIGSLOW.
BASKET BAIL.
No. 513,512. Patented Jan. 30, 1894.
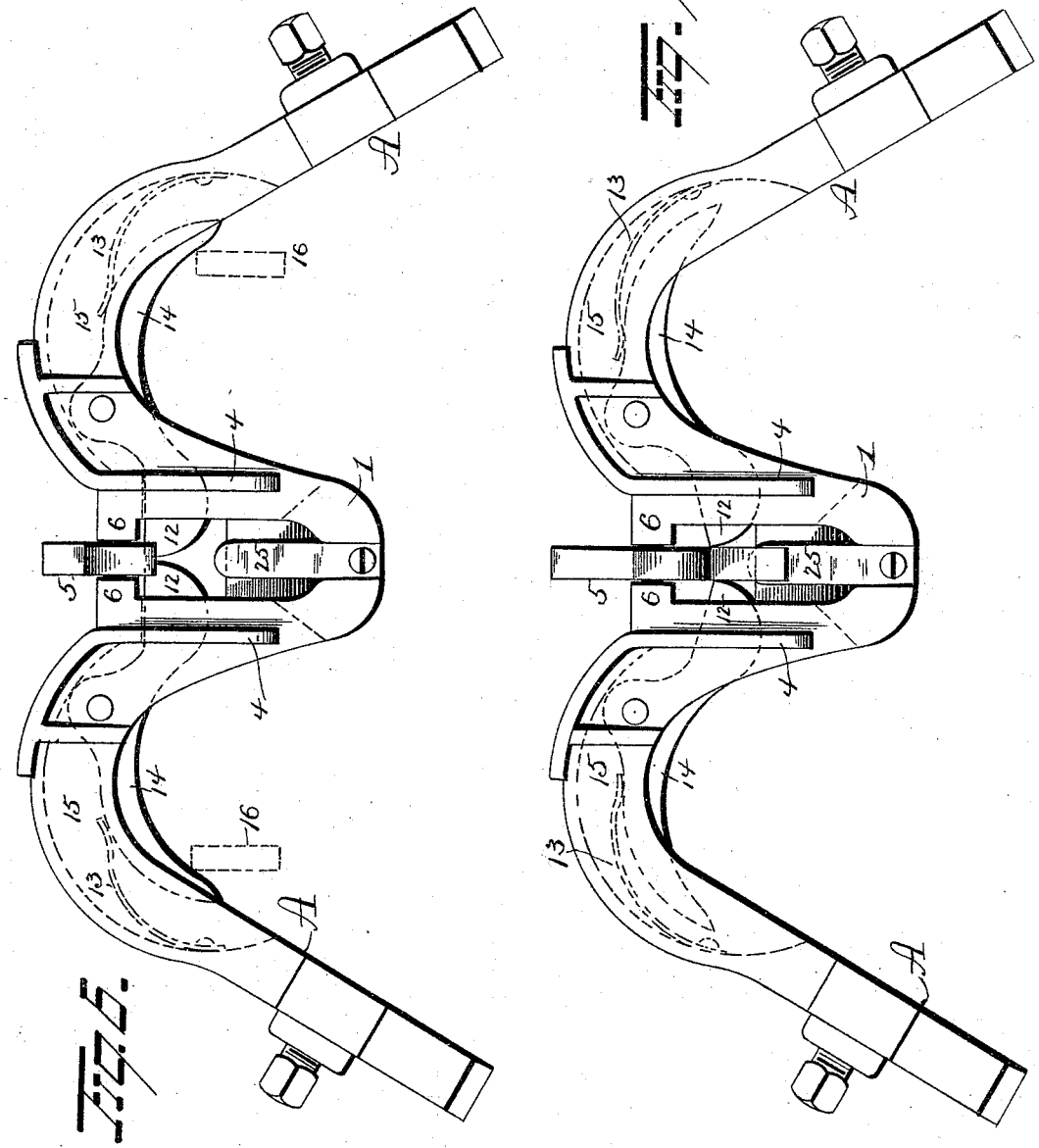
Witnesses
G. N. Nottingham
G. F. Downing,
Inventor
Otto Konigslow
By H. A. Seymour
Attorney

UNITED STATES PATENT OFFICE.

OTTO KONIGSLOW, OF CLEVELAND, OHIO.

BASKET-BAIL.

SPECIFICATION forming part of Letters Patent No. 513,512, dated January 30, 1894.

Application filed August 24, 1893. Serial No. 483,960. (No model.)

*To all whom it may concern:*

Be it known that I, OTTO KONIGSLOW, of Cleveland, in the county of Cuyahoga and State of Ohio, have invented certain new and useful Improvements in Basket-Bails; and I do hereby declare the following to be a full, clear, and exact description of the invention, such as will enable others skilled in the art to which it appertains to make and use the same.

My invention relates to an improvement in basket bails and forks for cash and package carriers, the object being to provide a simple means for locking these parts together automatically and absolutely preventing their shaking apart accidentally until it is desired to lower the basket, and the invention consists in a fork, in connection with a peculiarly constructed bail, the latter having a pivoted tumbler adapted to lock the bail to the fork, and means for automatically locking the tumbler, and for releasing it when occasion requires.

The invention further consists in certain novel features of construction and combinations of parts which will be hereinafter described and pointed out in the claims.

In the accompanying drawings, Figure 1 is a view in elevation of my improved apparatus. Fig. 2 is an enlarged detail, parts being broken away to show the position of parts just as the bail enters the carrier fork. Fig. 3 shows the position of the tumbler when it reaches its highest point. Fig. 4 shows the locked position. Fig. 5 shows the position the tumbler takes when released, and Figs. 6 and 7 are views of the bail in side elevation, to show the positions and operation of the locking levers.

A represents a basket bail, it being provided with the restricted central portion 1 which enters between the tines 2, 2, of the fork or hanger 3. This bail is also furnished with guards or shields 4, 4, as heretofore for guiding the bail into place between the tines of the fork or hanger.

The foregoing features are common to the Barr system of cash and package carriers.

A tumbler 5 is pivoted between lugs 6, 6, in the center of the bail. This tumbler is triangular in general shape having the three points 7, 8 and 9 formed thereon. The latter two 8 and 9 are formed at one side of the pivot and possessing a preponderance of weight have the effect of normally causing this end to hang downward when the free movement is not otherwise interfered with. The tumbler is provided with a notch or recess 10 on its under side preferably near the pivot, and a pair of locking levers 12, 12, are pivoted to the bail in such position that they engage the tumbler when their free movement is not otherwise impeded, and find their way into the notch or recess 10 when the latter is in position to receive the levers. The levers are made to assume this position by means of springs or equivalent devices 13, 13, and the outer ends 14, 14, of these levers normally depend below the curved portions 15, 15, of the bail where they are adapted to be operated by means of the hooks 16, 16, which take under the bail at these points and it is due to the weight of the basket and load or the upward pull upon the hooks 16, 16, that the outer ends 14, 14, of the locking levers are forced upward or into the recess formed for them in the bail, that the tumbler is unlocked, and vice versa when this pressure upon the levers is removed, the levers are in position to lock the tumbler upon its assuming the right position.

The internal arrangement of the fork or hanger is such that it controls the position of the tumbler, guiding it in an upright or substantially upright position as it enters between the tines or jaws and throwing it into a substantially horizontal or transverse position when it gets inside, to lock it in place. To accomplish this the interior of the fork or hanger is provided with three projections 18, 19, and 20, all of which jointly perform the function of guiding and rocking the tumbler. The lowest of these projections 20 has an inclining lower edge 21 which the normally uplifted end 7 of the tumbler engages as the center of the bail enters between the tines. Passing farther in between these tines, the projection 20 causes the tumbler to nearly reverse its position or in other words to assume a position with the projections 8 and 9 uppermost, in which position the tumbler is held by the end 7, which is downward, trailing along the slightly inclining inner face 22 of the projection 20, and the relative positions of the projections 19 and 20 and the length of the tumbler are such that upon the end 7 leaving face 22 the projection 9 reaches and engages the inclining lower end 19ª of projection 19. This engagement causes the tumbler to tilt slightly until the projection 8 strikes projection 19 and limits the tilting movement of the tumbler temporarily and stops the upward movement of the bail between the tines of the fork or hanger. Marking this position, it will be seen that projecting end 7 now hangs over the top of projection 20 and upon lowering the bail, the greater weight of ends 8 and 9 causes them to drop and they are caught upon projection 18. The ends 7 and 9 now rest upon projections 20 and 18 respectively and thus the tumbler supports the bail and being in this position the notch or recess 10 is in position to receive the ends of the locking levers 12, 12, which dropping into the latter, effect a secure locking which it is impossible to shake loose and which cannot be released until the hooks 16, 16, are again raised and the outer ends 14, 14, of the locking levers 12, 12, are forced upward into their sockets in the bail. This being done it is only necessary to raise the bail until the heavier end 9 drops from projection 18, permitting the tumbler to pass down between the projections 18 and 20 and the bail to pass down between the forks or jaws and leaving the tumbler in position for a repetition of the operation just described, a spring 25 preventing the tumbler from swinging too far beyond a certain point.

Thus to recapitulate it will be seen that the same upward pull upon the hooks to operate the locking levers, raises the bail and its load and the same lowering of the hooks not only lowers the bail but also releases the locking levers as soon as the tumbler stops the bail.

The fork or hanger may be pivoted or otherwise connected to the carriage and the hooks may be raised and lowered in any well known manner and it is evident that slight changes such as dispensing with one locking lever might be resorted to in the form and arrangement of the various parts described without departing from the spirit and scope of my invention and hence I do not wish to limit myself to the exact construction herein set forth, but, Having fully described my invention, what I claim as new, and desire to secure by Letters Patent, is—

1. The combination with a fork, or hanger having internal projections, of a bail, a tumbler pivoted thereto, and locking device for engaging and locking the tumbler when the latter is resting on the projections, substantially as set forth.

2. The combination with a fork or hanger having projections therein, of a bail, a tumbler pivoted thereto, and a pair of locking levers pivoted to the bail and adapted to lock the tumbler when the latter is resting on the projections, substantially as set forth.

3. The combination, with a fork or hanger having projections therein, of a bail, a tumbler pivoted to the bail, a pair of locking levers pivoted to the bail and adapted to engage the tumbler, the outer ends of said levers projecting in position to be operated upon to release the tumbler, and means for taking under the bail and levers for raising and operating the latter, substantially as set forth.

4. The combination with a fork or hanger having projections therein, of a bail, a tumbler pivoted to the bail, said tumbler having a notch or recess therein, and a locking lever pivoted to the bail and adapted to enter the notch or recess in the tumbler whereby to lock the latter, substantially as set forth.

5. The combination with a fork or hanger having projections therein, of a bail, a tumbler centrally pivoted in the bail, said tumbler having a notch or recess therein, and a pair of locking levers pivoted to the bail in position to enter the notch, the outer ends of these levers located in position to be engaged and operated for the release of the tumbler, substantially as set forth.

6. The combination with a fork or hanger having projections therein, of a bail, a tumbler pivoted in the bail and provided with three points, two of said points located on one side of the pivot, the tumbler provided with a notch, and locking lever adapted to enter this notch and lock the tumbler, substantially as set forth.

7. The combination with a fork or hanger having projections with inclining faces, of a bail, a tumbler pivoted to the bail and provided with three points adapted in turn to engage the inclining faces of the various projections whereby the tumbler is guided and controlled and means for locking the tumbler, substantially as set forth.

In testimony whereof I have signed this specification in the presence of two subscribing witnesses.

OTTO KONIGSLOW.

Witnesses:
LOUIS E. WEBER,
ALBERT F. SCHROEDER.